United States Patent
Lee

(10) Patent No.: US 6,341,073 B1
(45) Date of Patent: Jan. 22, 2002

(54) MULTIPLE VALLEY CONTROLLER FOR SWITCHING CIRCUIT

(75) Inventor: Nai-Chi Lee, Cortlandt Manor, NY (US)

(73) Assignee: Philips Electronics North America Corporation, New York, NY (US)

( * ) Notice: Subject to any disclaimer, the term of this patent is extended or adjusted under 35 U.S.C. 154(b) by 0 days.

(21) Appl. No.: 09/713,972

(22) Filed: Nov. 16, 2000

(51) Int. Cl.[7] .................. H02M 3/335; G05F 1/613; G05F 1/656
(52) U.S. Cl. ................ 363/21.02; 323/225; 323/271; 323/222
(58) Field of Search ................ 363/21.02, 21.03, 363/16; 323/222, 223, 225, 268, 271, 282, 283

(56) References Cited

U.S. PATENT DOCUMENTS

| | | | |
|---|---|---|---|
| 4,720,667 A | | 1/1988 | Lee et al. |
| 4,720,668 A | * | 1/1988 | Lee et al. ................ 323/271 |
| 4,785,387 A | | 11/1988 | Lee et al. |
| 4,841,220 A | * | 6/1989 | Tabisz et al. ............ 323/282 |
| 4,857,822 A | | 8/1989 | Tabisz et al. |
| 4,860,184 A | * | 8/1989 | Tabisz et al. ............ 363/17 |
| 4,866,367 A | | 9/1989 | Ridley et al. |
| 4,922,397 A | * | 5/1990 | Heyman ................... 363/17 |
| 5,067,066 A | * | 11/1991 | Chida ...................... 363/16 |
| 5,264,780 A | | 11/1993 | Bruer et al. |
| 5,442,540 A | | 8/1995 | Hua et al. |
| 5,486,994 A | * | 1/1996 | Pouliquen et al. ........ 363/98 |
| 5,594,634 A | * | 1/1997 | Rajashekara et al. ..... 363/98 |
| 5,619,406 A | * | 4/1997 | Divan et al. ............. 363/98 |
| 5,991,172 A | | 11/1999 | Jovanic et al. |
| 5,999,417 A | * | 12/1999 | Schlecht ................. 363/16 |
| 6,057,652 A | | 5/2000 | Chen et al. |

FOREIGN PATENT DOCUMENTS

EP 0757428 A1 2/1997

* cited by examiner

*Primary Examiner*—Bao Q. Vu
(74) *Attorney, Agent, or Firm*—Dicran Halajian

(57) ABSTRACT

A method for controlling a switching converter includes receiving a digitized waveform of a continuous switch parameter; analyzing the digitized waveform to detect a parameter local minimum; and opening the switch at a parameter local minimum. An apparatus implements the method preferably using a microcontroller and at least one waveform digitizer to determine instantaneous power dissipation. The microcontroller selects an optimum local minimum of the switching waveform to achieve optimum power dissipation.

18 Claims, 11 Drawing Sheets

QRC Test Circuit -- Sable Simulation results
*Relationship between T_off and average switching power loss*

Note 1: Switching power loss (I_d * V_d) averaged over 10 switching cycles at 1mS
Note 2: T_on = T*D, T_off = T*(1-D), Output Power = 80Watts

Test results with V_dc = 154V

| Period (uS) | Duty Cycle | T_on (uS) | T_off (uS) | Power loss (W) |
|---|---|---|---|---|
| 4.6 | 0.494 | 2.27 | 2.33 | 7.51 |
| 5 | 0.494 | 2.47 | 2.53 | 5.36 |
| 5.4 | 0.486 | 2.62 | 2.78 | 3.37 |
| 5.8 | 0.471 | 2.73 | 3.07 | 1.99 |
| 6 | 0.448 | 2.69 | 3.31 | 1.73 |
| 6.1 | 0.413 | 2.52 | 3.58 | 1.73 |
| 6.2 | 0.398 | 2.47 | 3.73 | 1.74 |
| 6.4 | 0.373 | 2.39 | 4.01 | 2.14 |
| 7 | 0.367 | 2.57 | 4.43 | 3.91 |
| 7.4 | 0.374 | 2.77 | 4.63 | 4.55 |
| 7.8 | 0.379 | 2.96 | 4.84 | 4.06 |
| 8.4 | 0.381 | 3.20 | 5.20 | 2.98 |
| 8.8 | 0.373 | 3.28 | 5.52 | 2.32 |
| 9 | 0.351 | 3.16 | 5.84 | 2.08 |
| 9.2 | 0.325 | 2.99 | 6.21 | 2.21 |
| 9.6 | 0.313 | 3.00 | 6.60 | 2.82 |
| 10.2 | 0.319 | 3.25 | 6.95 | 3.88 |

Test results with V_dc = 308V

| Period (uS) | Duty Cycle | T_on (uS) | T_off (uS) | Power loss (W) |
|---|---|---|---|---|
| 3.1 | 0.307 | 0.95 | 2.15 | 15 |
| 3.5 | 0.299 | 1.05 | 2.45 | 7.7 |
| 3.8 | 0.275 | 1.05 | 2.76 | 3.08 |
| 4 | 0.238 | 0.95 | 3.05 | 1.98 |
| 4.1 | 0.232 | 0.95 | 3.15 | 2.01 |
| 4.2 | 0.218 | 0.92 | 3.28 | 2.08 |
| 4.6 | 0.198 | 0.91 | 3.69 | 5.96 |
| 5.2 | 0.207 | 1.08 | 4.12 | 9.6 |
| 6 | 0.22 | 1.32 | 4.68 | 7.56 |
| 6.8 | 0.197 | 1.34 | 5.46 | 2.95 |
| 7.5 | 0.17 | 1.28 | 6.23 | 6.91 |
| 8 | 0.176 | 1.41 | 6.59 | 8.11 |
| 9.4 | 0.157 | 1.48 | 7.92 | 3.33 |

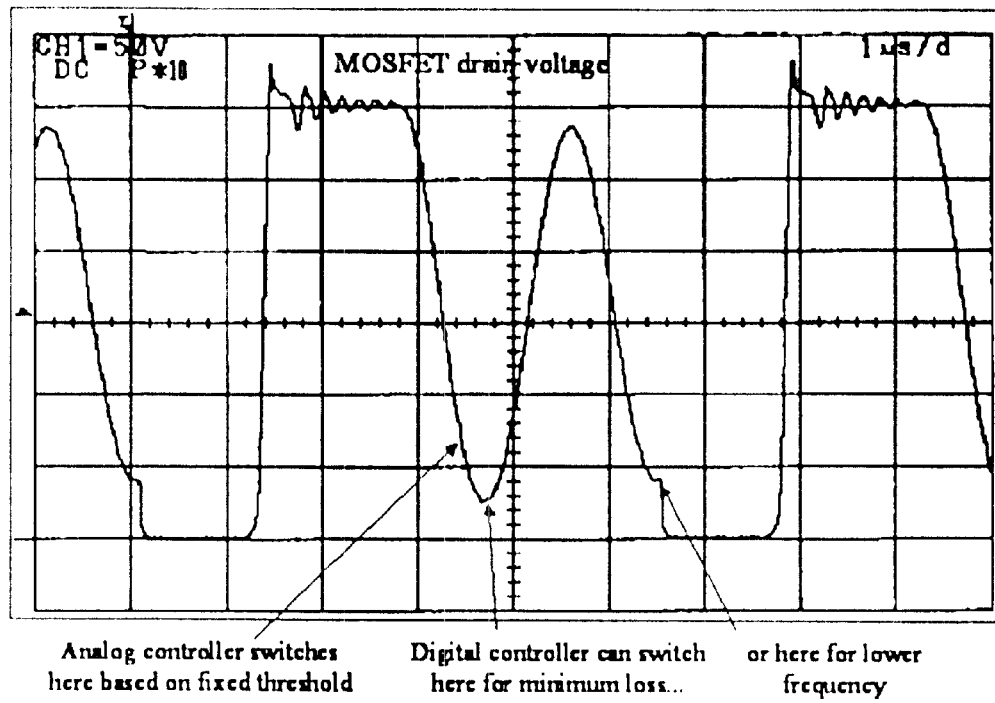

Analog controller switches    Digital controller can switch    or here for lower
here based on fixed threshold    here for minimum loss...    frequency

Fig. 8

QRC Operating under very light load
Measurement of Power Efficiency
Load = 2.84 K ohm (9.0 W across 160V output)
Input Power measured using Voltech PM 100
Note: Power consumption includes a resistor divider (141.5K) across V_d
Note: Gate driver is powered separately

|  | First-Valley Switching | | | | Second-Valley Switching | | | |
|---|---|---|---|---|---|---|---|---|
| $V\_ac$ (V) | T (uS) | f1 (KHz) | T_on (uS) | P_in1 (W) | T (uS) | f2 (KHz) | T_on (uS) | P_in2 (W) |
| 75 | 2.88 | 347 | 0.80 | 11.45 | 5.34 | 187 | 1.30 | 11.45 |
| 110 | 2.36 | 424 | 0.45 | 11.80 | 4.60 | 217 | 0.63 | 11.70 |
| 150 | 2.18 | 459 | 0.19 | 12.60 | 4.30 | 233 | 0.37 | 12.40 |
| 190 | 2.12 | 472 | 0.08 | 14.60 | 4.18 | 239 | 0.22 | 13.60 |
| 220 |  |  |  |  | 4.14 | 242 | 0.13 | 14.80 |
| 250 |  |  |  |  | 4.14 | 242 | 0.08 | 16.30 |

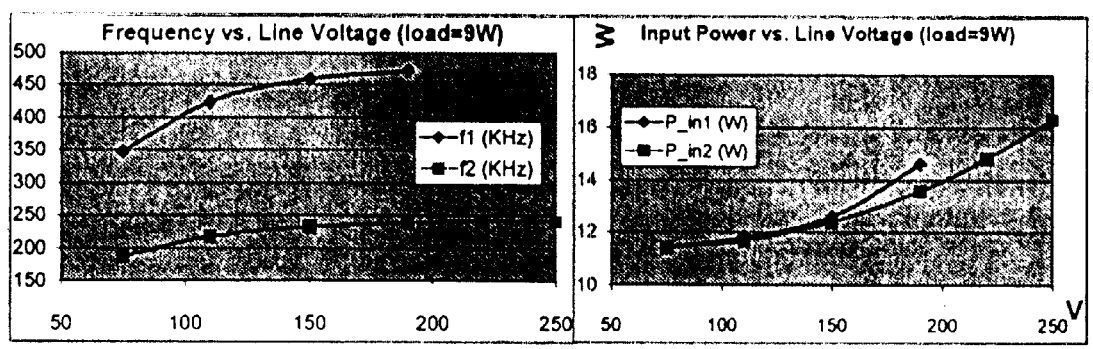

Fig. 9

QRC operating under normal load
Switching at First Valley of V_d vs. Second Valley Load = 333 ohm across 160V output (P_out = 76.9W)

First-Valley Switching:

| Input V_ac (V) | Period T (uS) | On-time T_on (uS) | Input I_ac (A) | Input Power(W) | Power Factor |
|---|---|---|---|---|---|
| 85  | 8.50 | 4.38 | 1.308 | 86.7 | 0.782 |
| 115 | 6.26 | 2.56 | 0.990 | 85.1 | 0.749 |
| 145 | 5.28 | 1.76 | 0.811 | 84.8 | 0.725 |
| 175 | 4.70 | 1.30 | 0.690 | 85.1 | 0.705 |
| 205 | 4.34 | 1.03 | 0.607 | 85.7 | 0.690 |
| 235 | 4.12 | 0.83 | 0.545 | 86.9 | 0.677 |

Second-Valley Switching:

| Input V_ac (V) | Period T (uS) | On-time T_on (uS) | Input I_ac (A) | Input Power(W) | Power Factor |
|---|---|---|---|---|---|
| 85  | 11.78 | 5.07 | 1.320 | 87.9 | 0.783 |
| 115 | 9.24  | 3.13 | 0.990 | 85.8 | 0.751 |
| 145 | 8.10  | 2.23 | 0.807 | 84.8 | 0.725 |
| 175 | 7.48  | 1.71 | 0.691 | 85.1 | 0.707 |
| 205 | 7.04  | 1.37 | 0.606 | 85.5 | 0.690 |
| 235 | 6.76  | 1.14 | 0.542 | 86.2 | 0.678 |

Summary:

| V_ac (V) | 1st-Valley Freq(KHz) | 2nd-Valley Freq(KHz) | 1st-Valley Power(W) | 2nd-Valley Power(W) |
|---|---|---|---|---|
| 85  | 118 | 85  | 86.7 | 87.9 |
| 115 | 160 | 108 | 85.1 | 85.8 |
| 145 | 189 | 123 | 84.8 | 84.8 |
| 175 | 213 | 134 | 85.1 | 85.1 |
| 205 | 230 | 142 | 85.7 | 85.5 |
| 235 | 243 | 148 | 86.9 | 86.2 |

Other Observations:
Power factor is unrelated to 1st or 2nd valley switching
2nd-valley switching becomes more efficient at higher line voltage (higher freq)

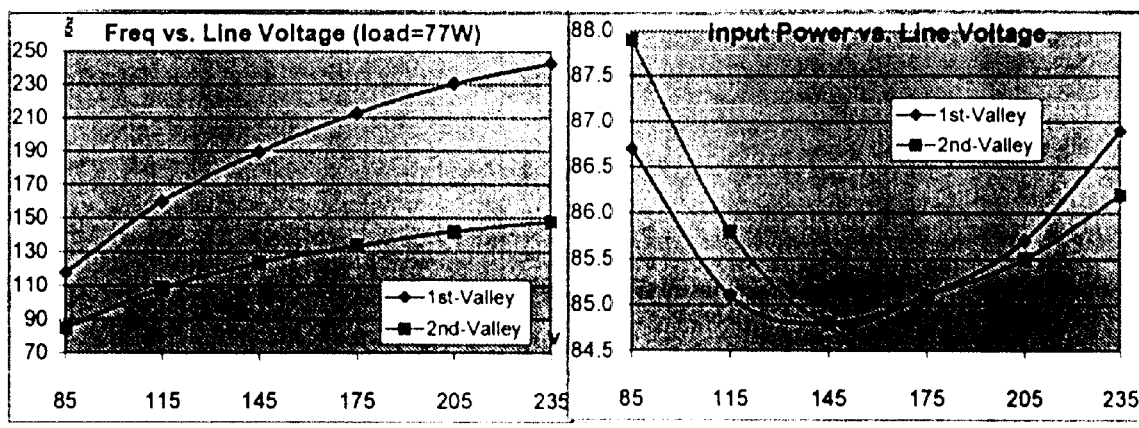

Fig. 10

MULTIPLE VALLEY CONTROLLER FOR SWITCHING CIRCUIT

BACKGROUND OF THE INVENTION

1. Field of the Invention

The present invention relates to resonant switching power transfer devices, and more particularly to improved algorithms, methods and systems for analyzing and operating a switched power supply for efficient operation over a wide range of power output.

2. Description of the Prior Art

In conventional resonant switching converters such as quasi resonant control DC-to-DC converters, a switching device, typically in the form of a semiconductor switch, turns on and off repetitively to pulse power from a source at high current levels. A simple prototype circuit is shown in FIG. 1.

As shown in FIG. 2, when the switch is turned on, the current ramps up at a generally linear rate, until the switch is turned off. The switch transitions are controlled by a controller, not shown in FIG. 1. After the switch is turned off, the diode conducts, discharging the tank circuit, and transferring energy to the transformer secondary and load. When the output diode stops conducting, the voltage across the switch begins to oscillate, initially dropping. A typical quasi resonant control triggers the switch to begin conducting at the first nadir or valley of this oscillation, to begin the cycle again.

The active switch may be controlled to close at any portion of the cycle. However, the power consumed by switching is proportional to the voltage squared impressed on the switch times capacitance of the switch, and also switching frequency, and thus designs have evolved which attempt to turn the switch on during a zero or minimum voltage phase of the dynamic transient. This process is called zero voltage switching (ZVS). The minimum voltage across the active switch may be non-zero in DC power supplies during normal operation.

A related topology provides zero current switching, in which the conduction state of an active switch is changed when a current is zero, called zero current switching (ZCS).

In order to time the closing of the active switch, a number of techniques are traditionally employed, for example, analog sensing of a minimum voltage, threshold sensing, or the like. Since, in many designs, the ringing of the transient oscillation decays to a value above the minimum voltage, for example the positive supply rail, and complex sensing algorithms are difficult to implement, traditionally, the switching logic is controlled based on a time delay, a voltage threshold, or a first-derivative zero crossing trigger.

In a power supply designed for a range of loads, efficiency at low loads may be impaired due to switching power loss. In essence, a suitable low impedance semiconductor switch for high currents has a high intrinsic gate capacitance. Therefore, the typical strategy of activating the switch at the first valley of the turn-off transient to recharge the tank, and adjusting the charge time in dependence on the load (i.e., pulse width modulation), results in excess losses due to switching inefficiency.

It is well known in the art that a turn-on loss in a DC-DC converter is markedly reduced by applying the zero-volt switching (ZVS) method to the voltage-resonant converter.

A conventional Quasi-Resonant Converter (QRC) is designed to achieve zero-voltage switching, or at least minimum-voltage switching. That is, the power MOSFET is turned ON at the first valley (minimum) of the drain voltage. The rational is that the potential energy stored in the primary resonant capacitor ($C=C_p$+parasitic) is equal to $½CV^2$. This energy is dissipated by the power MOSFET every time it switches on. So by minimizing V, power loss is minimized.

However, the actual switching power loss is $½CV^2f$, where f is the switching frequency of the power supply. The switching frequency of a QRC varies proportional to the input voltage, and inversely proportional to the output load. Hence switching power loss becomes unacceptably high under the worst-case combination of maximum input voltage and minimum load. This severely limits the operating range of a conventional QRC.

In a typical quasi resonant power supply design, for example using a Sanken F6656 controller, the controller does not detect the minimum value ("valley") of drain voltage directly. Instead it relies on fixed threshold crossing detection. Hence zero-voltage switching is not achieved even under best operating condition, e.g., 110V AC input and 80W load.

The frequency of operation varies greatly with line and load conditions. The frequency is highest under the combination of maximum line input and minimum load. Higher frequency results in higher EMI, and also higher switching loss. Consequently, operation range of this QRC is severely restricted due to limited frequency range. This limitation is not the fault of the analog controller, but a problem inherent in the self-oscillating mode of quasi-resonant operation.

High frequency Resonant, Quasi Resonant, and Multi-Resonant Converters have been discussed in many articles, see, e.g., various publications and patents by Fred C. Lee of Virginia Power Electronics Center; U.S. Pat. Nos. 4,720,667 (Lee et al), 4,720,668 (Lee et al), 4,857,822 (Tabisz et al.), for several examples of zero-current-switched quasi-resonant converters. Soft-Switching techniques, which include zero-voltage switching (ZVS) and zero-current switching (ZCS), have been employed in those converters to reduce switching loss incurred by the main switching element(s), typically a power MOSFET, in order to improve the overall efficiency of the power converter.

Zero-current-switched quasi-resonant converters (ZCS-QRCs) reduce turn-off losses by shaping the switching transistor current to zero prior to turn-off. This allows ZCS-QRCs to operate at frequencies up to about 2 MHz. Further increase of the switching frequency of ZCS-QRCs is difficult to accomplish because of capacitive turn-on loss. Also, the Miller effect comes into play in that it relates to turn-on of the transistor at non-zero-voltage and the resultant parasitic oscillations caused by the output capacitance of the transistor.

Zero-voltage-switched quasi-resonant converters reduce the problem of turn-off losses by shaping the switching transistor voltage to zero prior to turn-on. As a result, ZVS-QRCs can operate at higher frequencies, up to 10 MHz. However, the ZVS-QRCs have two major limitations. One problem is excessive voltage stress to the switching transistor proportional to the load range. This makes it difficult to implement ZVS-QRCs with wide load variations. Another problem is caused by the junction capacitance of the rectifying diode used in the quasi-resonant converter. When the diode turns oft, this junction capacitance oscillates with the resonant inductance. If damped, these oscillations cause significant power dissipation at high frequencies; undamped, they adversely affect the voltage gain of the quasi-resonant converter and, thus, the stability of the closed-loop system.

By definition, a Quasi-Resonance mode means that the system operates with variable frequency and with discontinuous current. The oscillation frequency is not directly controlled for a quasi resonant converter. Instead, the ON-time $T_{on}$ and OFF-time $T_{off}$ of the power switching device is controlled. Frequency variation is a result of changes in $T_{on}$ and $T_{off}$.

The ON-time of the power device is determined by the DC supply voltage, the primary inductance, the maximum drain current, as well as the feedback (regulation) voltage. In the case of a preferred embodiment of the invention, a quasi resonant converted embodiment is provided with a peak value of $I_d$ of 6A, which is given by $V_{th}$ (0.73V) divided by $R_4$ (0.12 ohm). At 110V AC input, $dI/dt=V/L=150V/142$ $\mu H=1.06A/\mu S$, approximately. The maximum $T_{on}$ is then 5.6 $\mu S$ (in the absence of feedback voltage). The presence of feedback voltage adds a DC bias (which is proportional to the output error signal) to the current waveform. As the output voltage gets closer to tie regulated value, a higher DC bias is applied. This essentially lowers the peak value of $I_d$, which is equivalent to making $T_{on}$ shorter, and hence less energy is transferred each cycle.

The OFF-time of the power device is traditionally determined by how long it takes for the output diode to finish conducting (load-dependent), plus a time period for the drain voltage to drop to its minimum value. When the power device is first turned off; $V_d$ (drain voltage) rises to its peak value, which is equal to $V_{dc}$ plus the reflected voltage form secondary (output voltage times transformer turn-ratio), as long as the output diode is still conducting. Once the output diode stops conducting, $V_d$ starts to fall towards its minimum of $V_{dc}$ minus reflected voltage, at a rate determined by the resonant frequency of the primary L-C circuit. This time duration is given by $T=\pi\sqrt{}\sqrt{(L_p \cdot C_p)}$, where $L_p$ and $C_p$ are inductance and capacitance of the primary side.

For efficiency and EMI considerations, it is desirable to turn on the MOSFET when $V_{ds}$ drops to zero (zero-voltage switching), or at least when it is at a minimum. In the case of the preferred quasi resonant control unit: $L_p=142$ $\mu H$, $C_p=470pF$, hence $T=0.81$ $\mu S$. The reflected voltage is about 150V.

Lab measurement of a known QRC controller integrated circuit, a Sanken F6656, showed that the MOSFET turns on when $V_d$ drops to around 75V, under low line voltage (110V AC) and nominal load (80W). Thus, it is apparent that the circuit does not actually achieve zero-voltage switching. The situation is much worse under high line voltage (220V AC) and light load.

It is noted that the issues raised in this topology arise in a great variety of circuits, including but not limited to Quasi Resonant power supplies. However, the general issues arise in any case where a control strategy is implemented based on complex characteristics of a dynamic non-monotonic waveform to achieve optimal efficiency.

SUMMARY OF THE INVENTION

The present invention provides a system for controlling a system, wherein the control is implemented based on a non-monotonic dynamic waveform, to achieve an optimum performance under a wide range of output load and input line conditions.

According to one embodiment, an efficiency of the system is modeled, and a switch selectively operated in a plurality of time-differentiated modes in order to optimize performance.

According to a second embodiment, an operational range of a system is expanded to include a larger power output ratio by selectively operating a switch of the power supply on differing events.

It is noted that the performance parameter is typically efficiency, i.e., the ratio of power delivered to the load to power drawn from the source. However, other performance parameters may be optimized, for example load regulation, electromagnetic interference, heating of switch elements, or the like. Typically, the control according to the present invention comprises a programmable digital control receiving at least one digitized waveform, for example, the drain voltage $V_d$ of a switching MOSFET. Likewise, an additional parameter would be the drain-source current $I_{ds}$. Since the dynamic switching transient is of particular relevance, the MOSFET $V_d$ must be sampled with sufficient precision to allow estimation of its true state. While generally, this transient must be sampled at a rate higher than the Nyquist rate of the highest principle frequency component, it is possible to subsample the signal, and attempt to reconstruct the waveform from a number of switching transients. This requires, however, a precision track and hold circuit, but permits a slower analog to digital converter circuit to be employed.

For example, in a quasi-resonant power supply, the switch may be operated synchronized with an oscillation of the tank circuit, wherein the synchronization may represent an arbitrarily selected oscillation, rather than being limited to a first waveform valley, as in present designs. The selected mode of operation may be selected based on a measured or estimated performance, and/or the measured or estimated effect of the putative selected mode on performance.

Thus, under high input voltage/low load conditions, which normally produce a very short on cycle, and thus high frequency operation, the typical QRC suffer from low efficiency, i.e., the ratio of power consumed within the power supply to power transferred to the load is high. In fact, the QRC need not operate at this high frequency in order to maintain load regulation; rather, the traditional control algorithm forces this condition. Thus, according to the present invention, the control algorithm is improved by inserting a delay prior to permitting switch activation. Thus delay may control the actual switch activation, or merely act as a gate for the nonnal minimal voltage switching algorithm.

According to the present invention, this delay may be generated in a number of ways. First, the input voltage and load may be directly or indirectly measured, for example by measuring the MOSFET switch $V_{ds}$ and $I_{ds}$ simultaneously, which, when multiplied, determine the power dissipated. Since we presume that the load is relatively constant over the course of a test, then the conditions which reduce the power drawn from the power source will maximize efficiency.

It is noted that, because the tank resonance decays over time to a local waveform minimum voltage which increases over time, with each succeeding interval, the relative power dissipation due to the switch transition itself will increase. In addition, as the time-period between switch intervals increases, the current draw during the on interval will increase. Thus, a most efficient solution to the problem is not an extraordinary delay in turn on. Thus, a local search for optimum switching interval will not normally yield a trivial and unworkable infinite delay.

Thus, the present invention balances the decreased efficiency of low loading frequency operation with the decreased efficiency of switching at a non-minimal voltage level, which are interrelated according to the formula $P=\frac{1}{2}CV^2f$ (switching loss) and $P=I^2R$ (conduction loss), where I is the RMS current, which can be readily calculated in known manner.

Experiments have determined that the most commonly selected switching intervals for maximum efficiency are the first, second and third resonance peaks. Therefore, in a typical design, the local search may be limited to these intervals in a feedback optimizing system, or a map may be defined limited to these choices in a look-up table based embodiment.

While often, the status of the system will be measured using an instantaneous power dissipation calculation, this is not always necessary. For example, in a microcontroller-based system, the load may sometimes be calculated based on operating parameters. Alternately, a relatively simple thermal sensor may be employed to detect the load dissipation. Finally, a relatively simple and non-time critical signal may be available corresponding to the load range.

Input voltage can often be easily measured, typically, the source has a low impedance and relatively small dynamic variation. This voltage may also be estimated based on other factors.

It is further noted that the power supply pulses may also be analyzed in order to control the power supply. In this case, precision timing, rather than voltage and current detection, are relied upon to detect operational parameters. Thus, the operational made of the system may be defined based on the operating frequencies. For example, as stated above, a particular limitation on the efficiency of a QRC power supply is the high voltage/low load condition, which, inherently, can be detected based on the frequency. The on time of the MOSFET switch, $T_{on}$, is controlled by the power supply controller based on an error signal from the output, and will be short under lightly loaded conditions and high input voltage. Simply by detecting (or knowing, since this is a controlled parameter) the $T_{on}$ duration and operating frequency, the operational mode of the circuit may be detected. By employing a control sensitive to this operational mode, and thereby selecting a delay window for switching, further control of the circuit is achieved, with potential for enhanced efficiency.

In the case of analog controller, as used in traditional power supply control circuits, the control algorithms are relatively primitive. As the same control algorithm has to cover all operating conditions, optimized operation is usually only possible over a narrow region, and many circuit components must be over-designed to cover worst-case combinations (such as highest line voltage and lowest load, or lowest line voltage and highest load).

The use of a digital controller for power conversion circuits provides many advantages over their traditional analog counterpart. One main advantage inherited in the digital controller is in its flexibility in implementing control algorithms, and indeed the ability to readily alter the control algorithm adaptively. A second is the ability to readily provide path dependence, i.e., a memory for a prior state. In the case of digital controller, as the control algorithm is implemented in software, various control methods can be analyzed, without physically altering the circuit configuration. More sophisticated control algorithm can be developed for digital controller in order to optimize efficiency of the power supply over a wide range of operating conditions.

The MOSFET on time ($T_{on}$) determines how much energy is stored into the primary inductance during each switching cycle. Its duration depends on the DC input voltage $V_{dc}$ and the primary inductance $L_p$. Higher $V_{dc}$ or smaller $L_p$ means steeper slope, hence shorter $T_{on}$. In the case of digital controller, we can measure the value of $V_{dc}$. As $L_p$ is known and fixed, we can then calculate maximum value of $T_{on}$ directly and program it into PWM. So in this case, no cycle-by-cycle peak current detection is necessary. In order to achieve voltage regulation, we can sample the output voltage and subtract dT from the value of $T_{on}$, where dT is proportional to the error signal of output voltage. That is, make $T_{on}$ shorter if the output voltage is too high, and make $T_{on}$ longer (but within the maximum limit) if the output is too low. This also provides an additional and independent advantage, being able to control the output accurately and adaptively, and to predict and control transients.

Thus, it is an object according to the present invention to provide a digital control for a power supply to infer an efficiency factor, and control the power supply, e.g., the switching of the MOSFET, based on this variable.

It is also an object of the invention to provide a control for a resonant mode power supply capable of selecting a desired oscillation cycle or portion of a cycle, e.g., a selected order local minimum of the damped oscillation following a switching transient in a quasi resonant control, to cause a switch transition to occur.

It is a further object of the invention to provide a programmable digital control for a power supply implementing an adaptive feedback dependent control algorithm for maximizing an inferred efficiency factor of the power supply.

It is a still further object of the invention to provide a time gate for selecting a window for activation of a switching process, on or after an initial permissible switching window.

These and other objects will be apparent from a review of the drawings and detailed description of the preferred embodiment.

BRIEF DESCRIPTION OF THE DRAWINGS

The foregoing and other objects, aspects and advantages will be better understood from the following detailed description of a preferred embodiment of the invention with reference to the drawings, in which:

FIG. 8 shows a second valley switching voltage waveform;

FIGS. 9 and 10 show tables and graphs of frequency vs. line voltage and input power first vs. line voltage for first and second valley switching for light and heavy loads, respectively.

DETAILED DESCRIPTION OF A PREFERRED EMBODIMENT OF THE INVENTION

EXAMPLE 1

Figure 1:
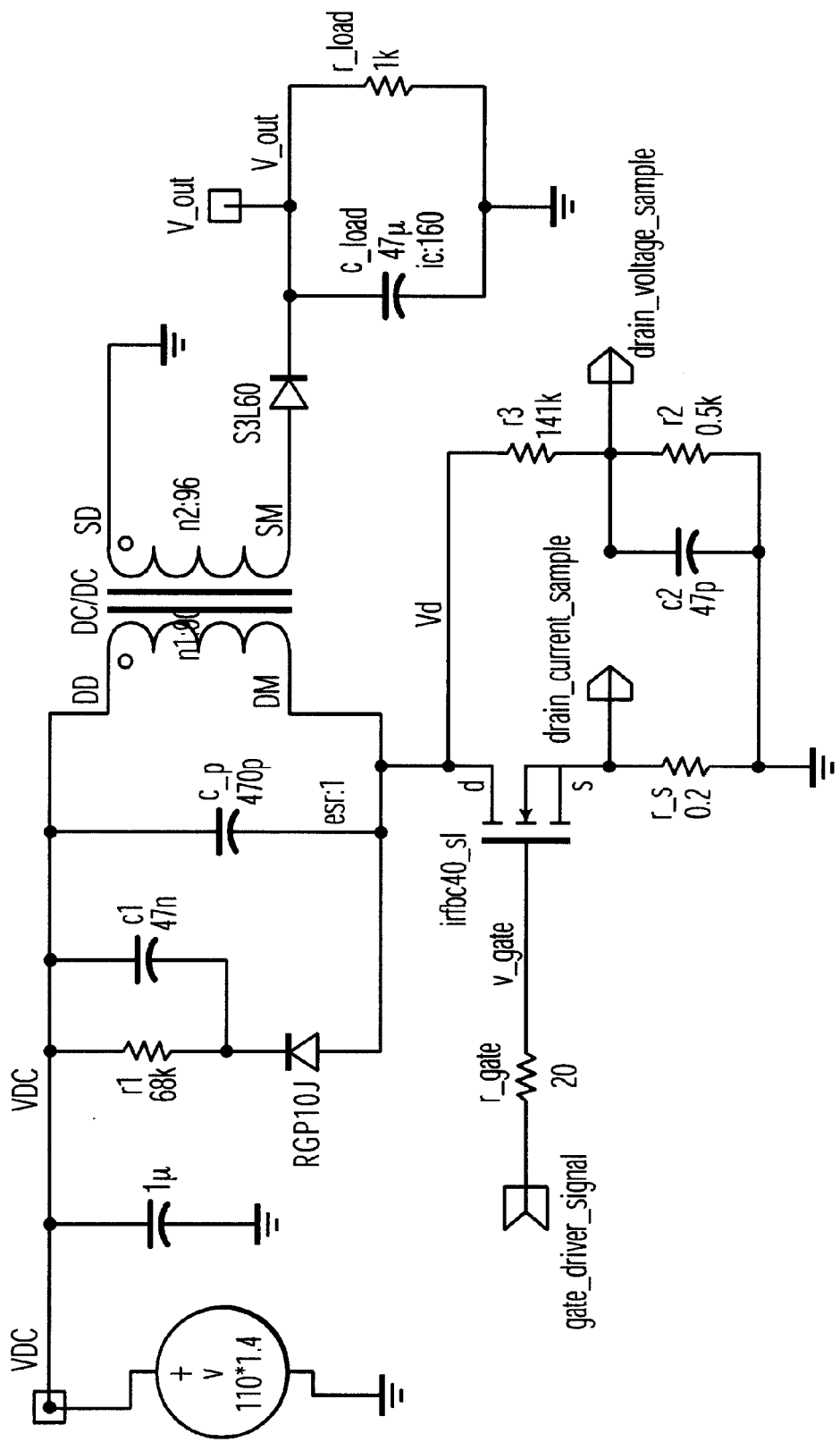
FIG. 1 is a schematic diagram of a prior art half-bridge, zero-voltage-switching, quasi-resonant-converter.
Figure 2A:
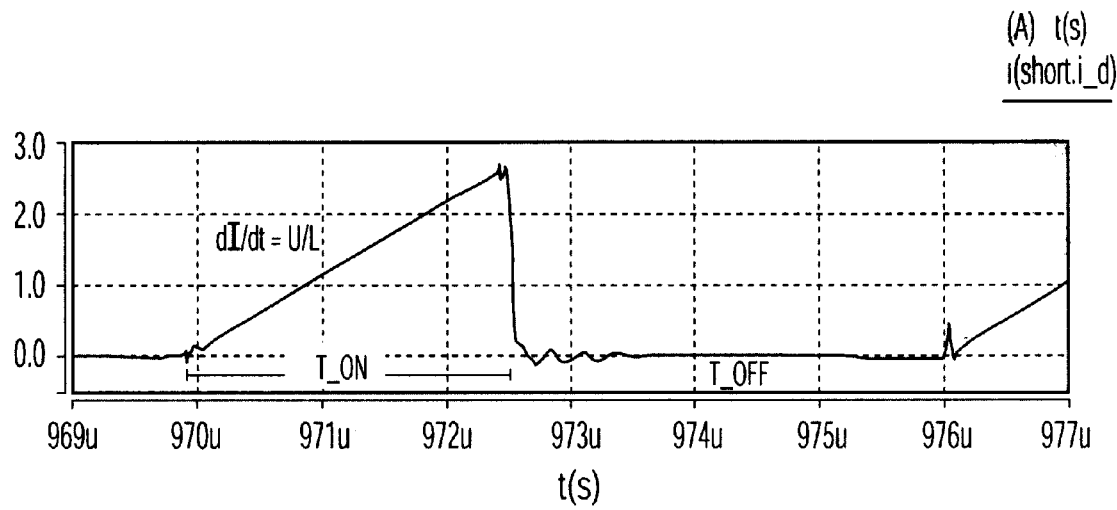
FIGS. 2A and 2B show the current and voltage waveforms, respectively, through the switch.
Figure 2B:
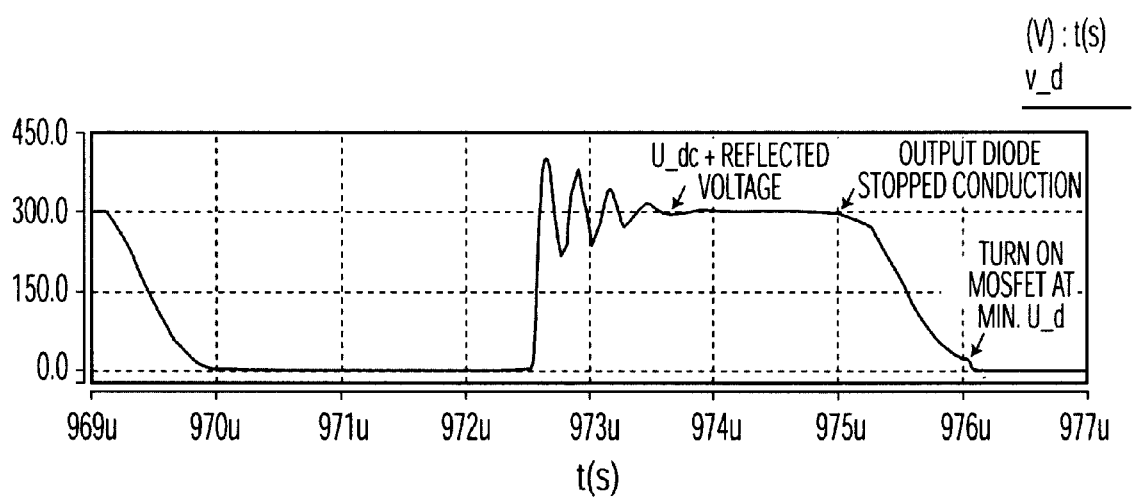
Figure 3:
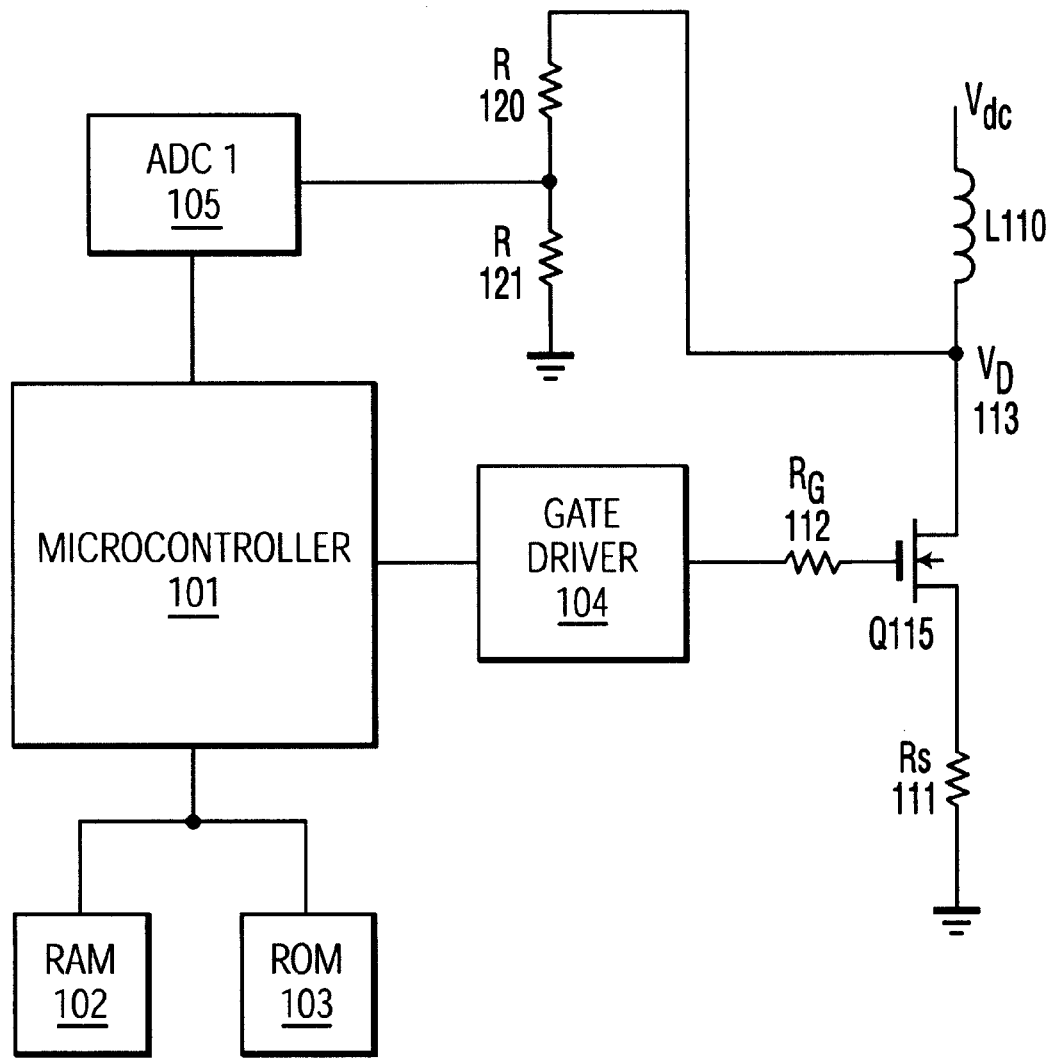
FIG. 3 shows a microcontroller with dual analog-to-digital converters for sensing current mid voltage simultaneously.

The circuit shown in FIG. 3, which is a prototype quasi resonant control power supply circuit, similar to FIG. 1, was simulated in Saber. The power device employed in the simulation is the MTP4N50E, which is a MOSFET rated at 4A, 500V, and with $R_{on}$ of 1.4 ohm. The magnetizing inductance of the primary side inductance L110 is given as 142☐H, while the leakage inductance is assumed to be 2☐H. $T_{on}$ is adjusted according to the error signal from secondary side, hence the output voltage is always regulated at 240V. The output power is 80 Watts with the given load resistor value. By setting different time period for the oscillator, a series of $T_{on}$ and $T_{off}$ is thus obtained. The real power loss is calculated in Saber by multiplying the instantaneous values of $V_d$ and $I_d$, and then taking the average over ten complete switching cycles. This predicted power loss correlates with actual measurements of power loss, and therefore provides the basis for use of a model of the circuit in inferring power loss, even without a real measurement of $I_d$. See FIG. 6.

According to the present invention, a software control scheme is employed to adaptively adjust the duration of $T_{off}$, until the minimum value of an inferred power loss is reached. This optimization process may be performed, for example, at power up, and whenever there are changes in line voltage or load conditions. The speed of this software control scheme is not critical and it may take several milliseconds for each iteration.

Figure 4:
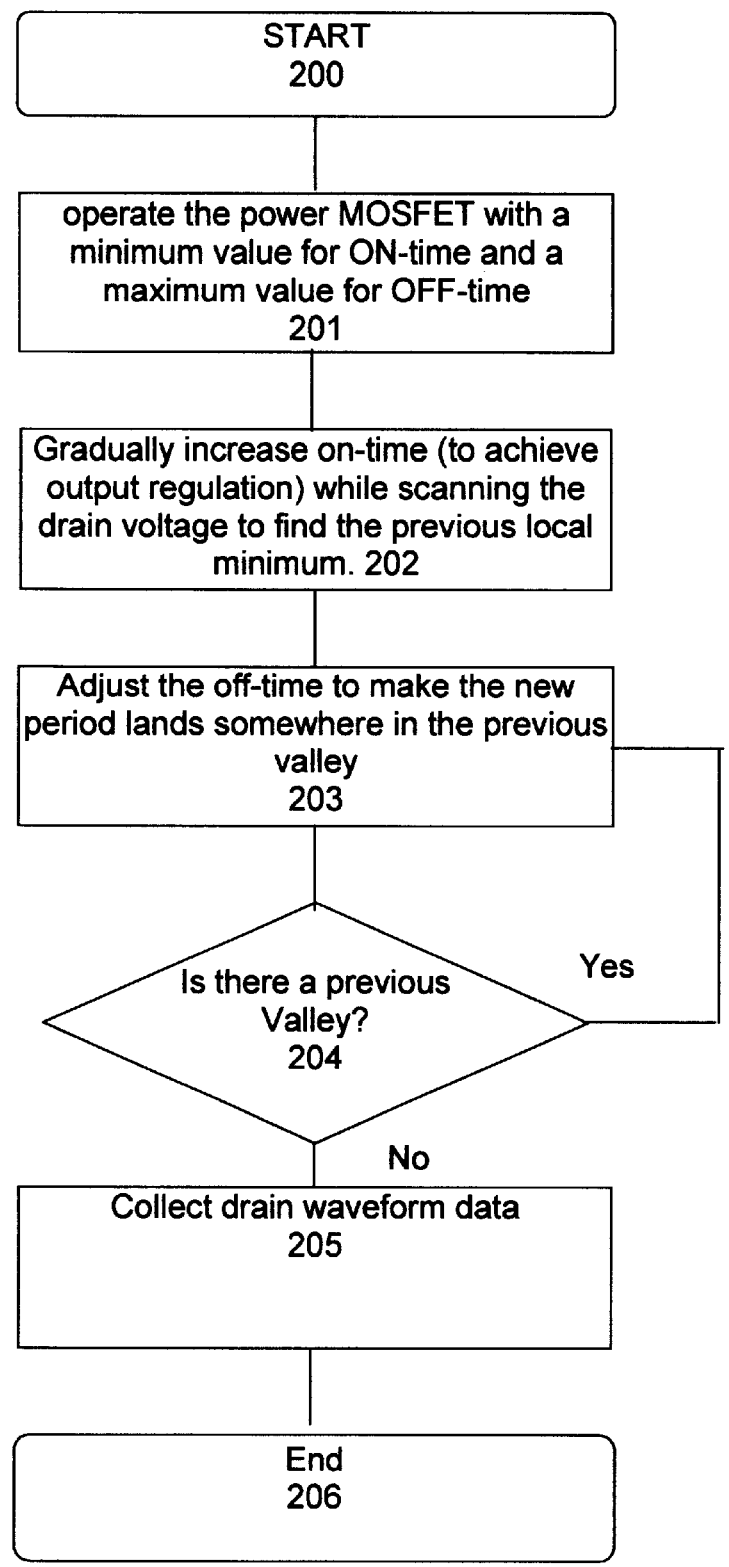
FIG. 4 shows a flow diagram for a digital control for detecting a first valley in a waveform.

FIG. 3 shows an exemplary schematic microcontroller circuit for implementing the control, and FIG. 4 a respective flowchart for a control method for first valley detection and switch triggering. In FIG. 3, a microcontroller 101, for example, an 80C51 microcontroller derivative, receives a digitized signal from an analog to digital converter 105 for sampling the drain voltage 113 (scaled down to a reasonable amplitude using a simple resistor divider including resistors R120 and R121). Preferably, a high-speed analog to digital converter 105 (ADC) (8-bit, 5M samples per second, or higher) is employed. The microcontroller 101 controls the gate driver 104 for the MOSFET Q 115. The control program of the microcontroller is stored in ROM 103, while dynamic and adaptive parameters may be stored in RAM 102. The microcontroller 101 infers the power dissipated by the switching, from the drain voltage $V_d$ and known static and dynamic parameters of the circuit, including the capacitance, resistance and operating frequency.

The switch transition timing with respect to the oscillation of the circuit after the diode ceases conducting is incrementally varied over the course of successive cycles of operation, mapping the power consumed during the switching with the relative timing. After the mapping is completed, the microcontroller 101 then continuously controls the MOSFET Q 115 switch to close at the optimum time, to achieve lowest inferred switching power losses. Alternate or additional control algorithms may be employed, for example to minimize generated electromagnetic interference or to spread the interference over a broad band by ensuring that the switch closure timing is not a perfectly repetitive sequence.

The digitizer measuring the voltage is also employed to monitor continuing operation of the device. If the voltage waveform changes significantly from prior cycles, the control then reoptimizes the switching timing. It is noted that the system may also be configured to measure a current waveform from the circuit, for example drain current (which may be calculated from a voltage across $R_s$ 111).

The main advantage of this control scheme is that it can adapt to changing supply voltage and load condition, and always arrive at the optimum switching time for minimum loss. This is far superior to a fixed threshold scheme, wherein the MOSFET always has to turn on before $V_d$ reaches its minimum, in order to reserve some safety margin.

It is possible to employ an aliasing technique, in which time values of sequential repetitive waveforms taken at below the Nyquist rate are reconstructed into a more precise waveform.

EXAMPLE 2

According to a second embodiment of the invention, digital control techniques are employed to allow the QRC to selectively switch-on at any of the local-minimums of drain voltage, including the first-valley, second-valley, or any higher order valleys.

The decision on which valley to select is based, for example, on computed results on actual switching power loss. Under high input voltage and low load conditions, it has been experimentally demonstrated that switching at second- or higher-order valleys can actually reduce switching power loss.

One immediate benefit of the above method is that by switching at higher-order valleys, the operating frequency of the QRC can be significantly reduced under high-input/low-load situation. This means that the multiple-valley QRC will be able to operate efficiently over a much wider range of input and load conditions.

The drain voltage of the power MOSFET is sampled using a fast analog-to-digital converter. These sampled data points are fed into a micro-controller (80C51, for example) for analysis. The control program can then figure where are the local minimums, and hence the period of the resonant oscillation.

Figure 5:
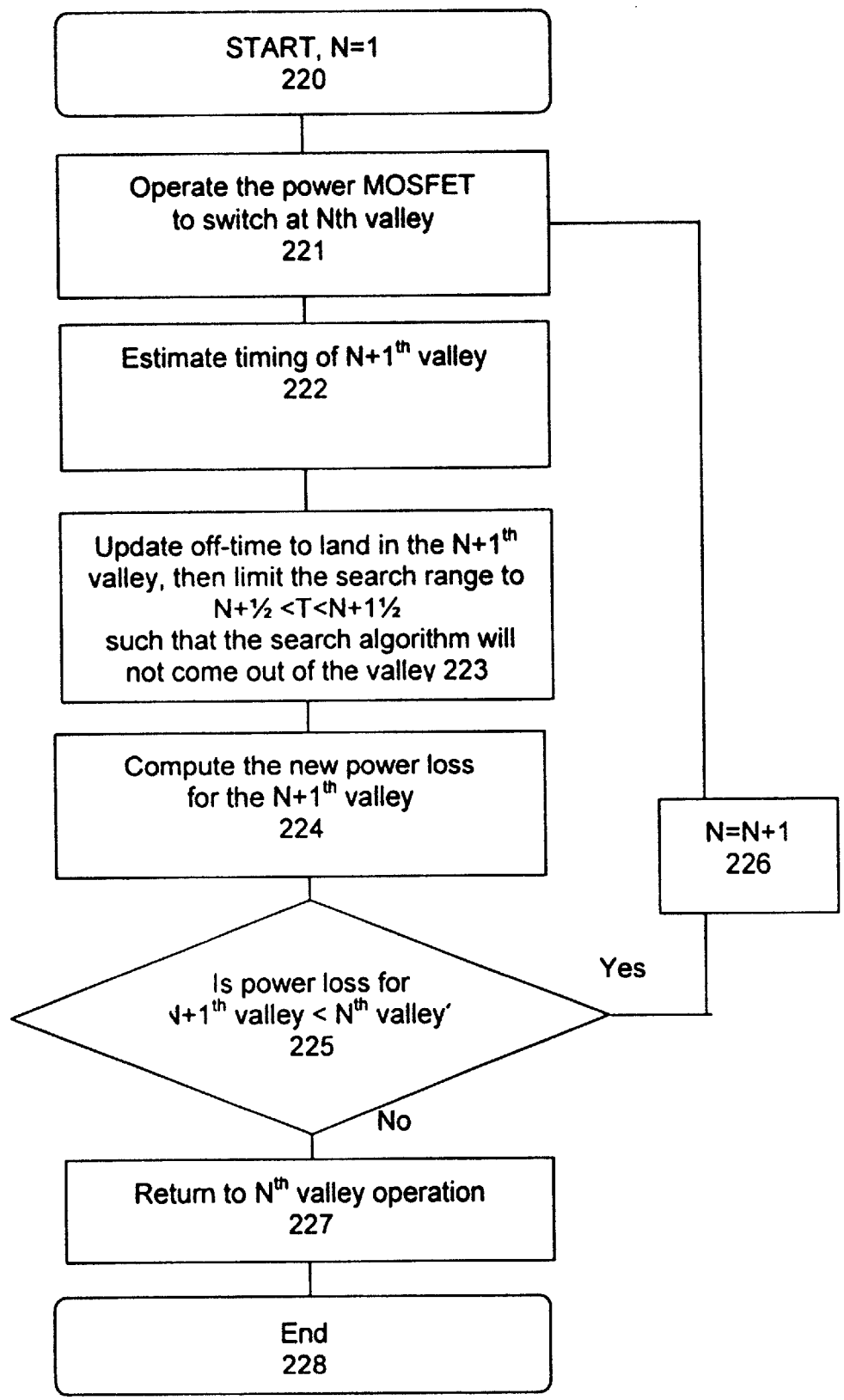
FIG. 5 shows a flow diagram for a digital control for detecting an $N^{th}$ first valley in a waveform.
Figure 7A:
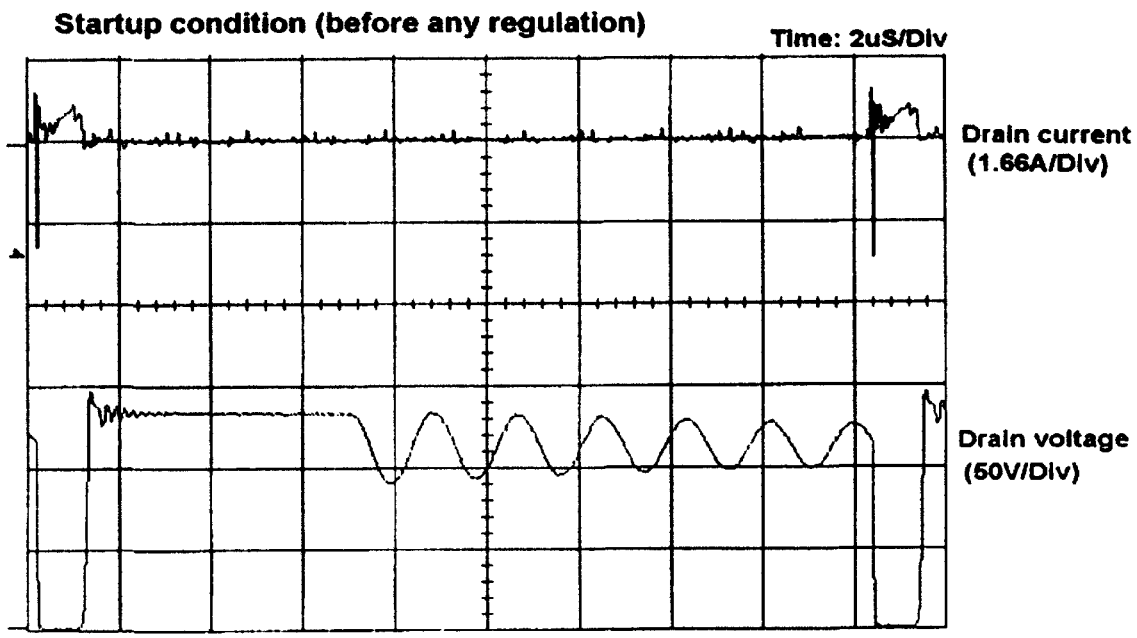
FIGS. 7A–7F show current and voltage waveforms for various timepoints, respectively during a search for an optimal switching window.
Figure 7B:
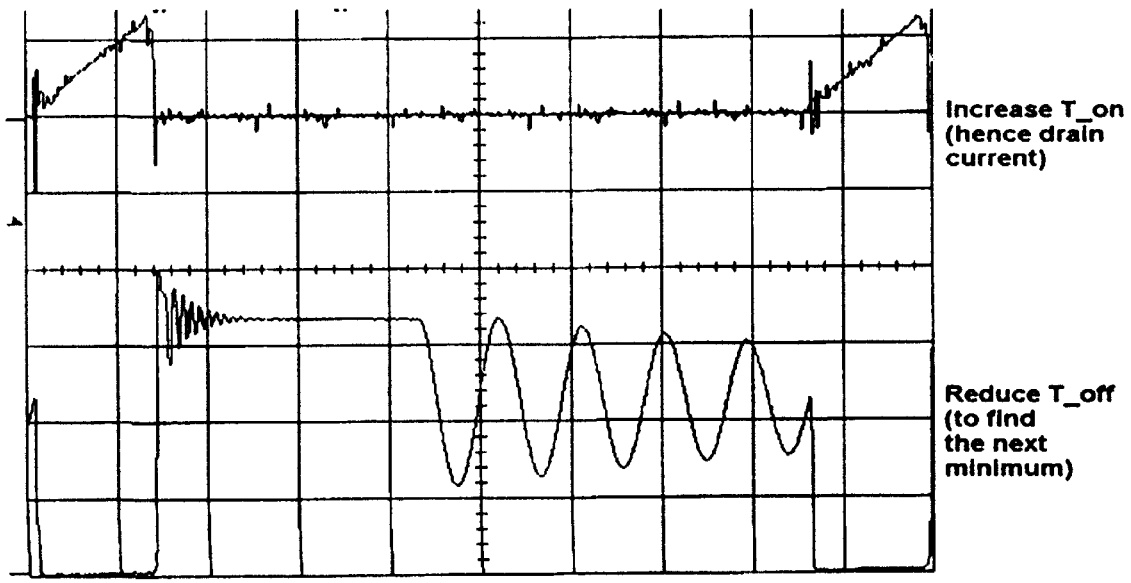
Figure 7C:
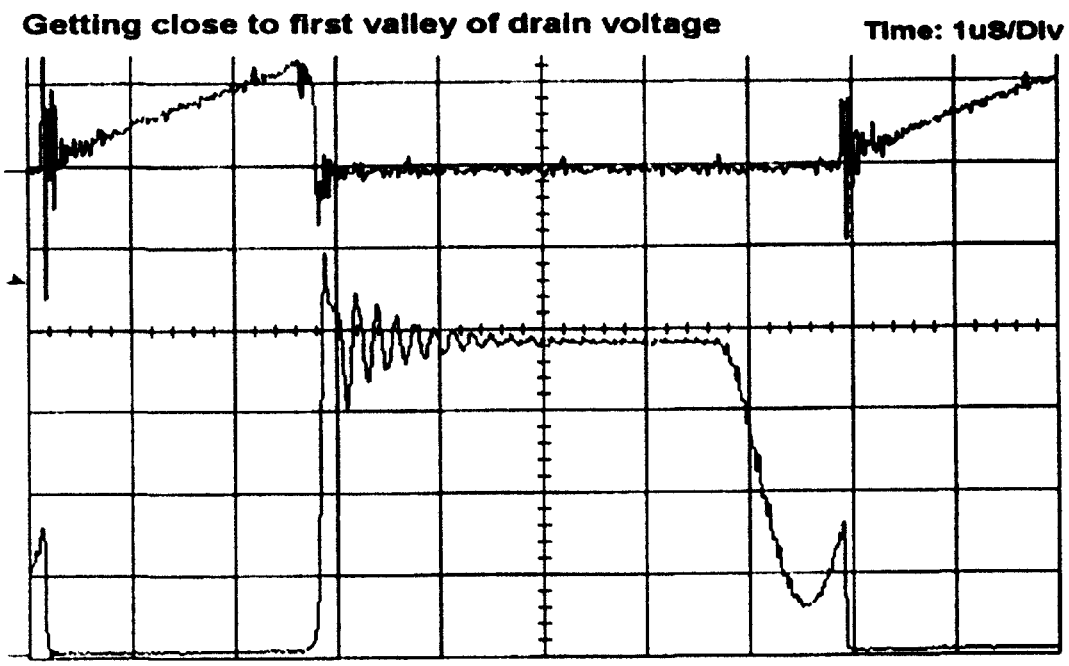
Figure 7D:
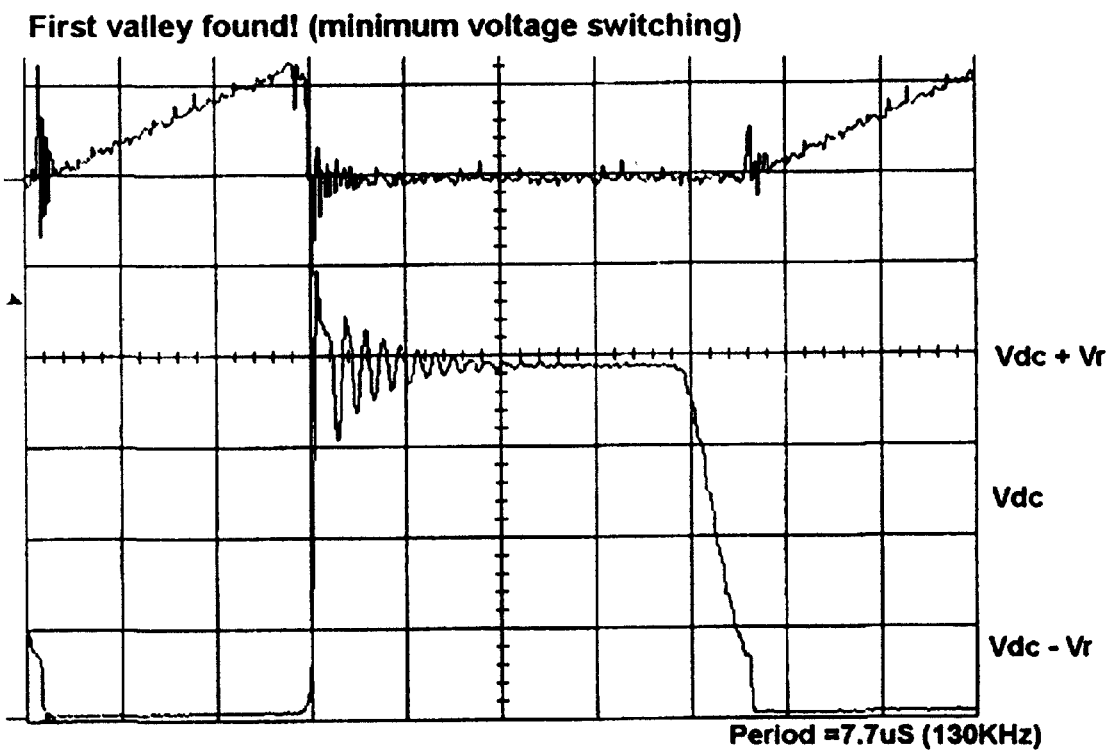

The procedure is outlined below, shown in FIGS. 4 and 5:
1. During startup, operate the power MOSFET with a minimum value for ON-time and a maximum value for OFF-time 201 (hence very low frequency and duty cycle), as shown in FIG. 7A.
2. Gradually increase on-time (to achieve output regulation) while scanning the drain voltage to find the previous local minimum 202. Adjust the off-time to make the new period lands somewhere in the previous valley 203, as shown in FIG. 7B. Each proposed operating point is tested to determine if it is the first valley 204.
3. Within a few iterations, the search algorithm will bring the off-time to be close to the first valley 221, as shown in FIG. 7C.
4. When the first valley is reached, we can collect a lot of information from the drain wavefonm 205, as shown in FIG. 7D.

First of all, we can find out the voltage at the flat part of the drain waveform. This gives Vdc+Vr, where Vr is the reflected voltage from secondary side.

Next, we can measure the voltage at the first valley of the drain waveform. This gives Vdc−Vr.

Based on the above two values, we can calculate the input voltage Vdc, as well as the reflected output voltage Vr.

The switching power loss can then be calculated as P=½CV²f, where V=Vdc−Vr is the minimum voltage, and f is the frequency, $1/(T_{on}+T_{off})$.

Furthermore, we can determine the time required for the drain voltage to fall from its flat part to its lowest point. This is the time constant of the resonant circuit and is determined by $$T = \pi \sqrt{(L_p \cdot C_p)}$$

Note that in our case, this time constant is determined from the actual waveform, so it is not affected by component tolerance and parasitic.

Figure 7E:
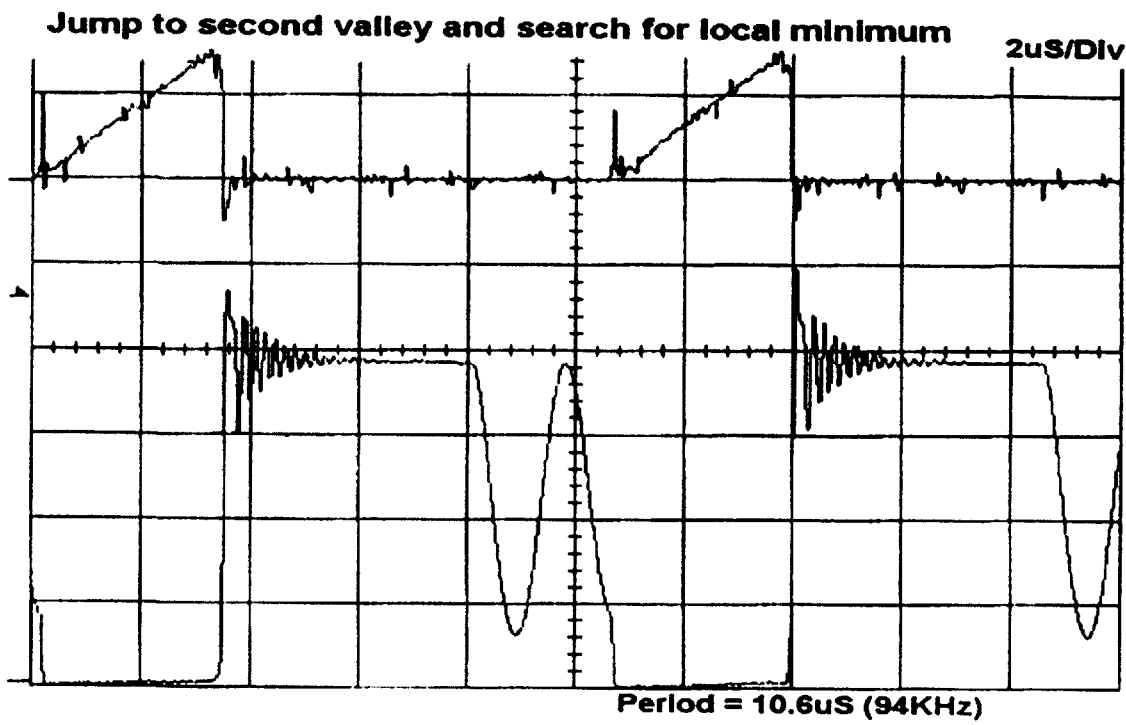

5. Based on the information collected so far, we can make an "educated guess" on where is the second valley 222. Update off-time to land in the second-valley, then limit the search range to half of T, such that the search algorithm will not come out of the valley 224, as shown in FIG. 7E.

Compute the new power loss for the second valley 225. If it is lower than that for the first alley, then we know that we are moving in the right direction. Otherwise we should return to he previous valley 227.

Figure 7F:
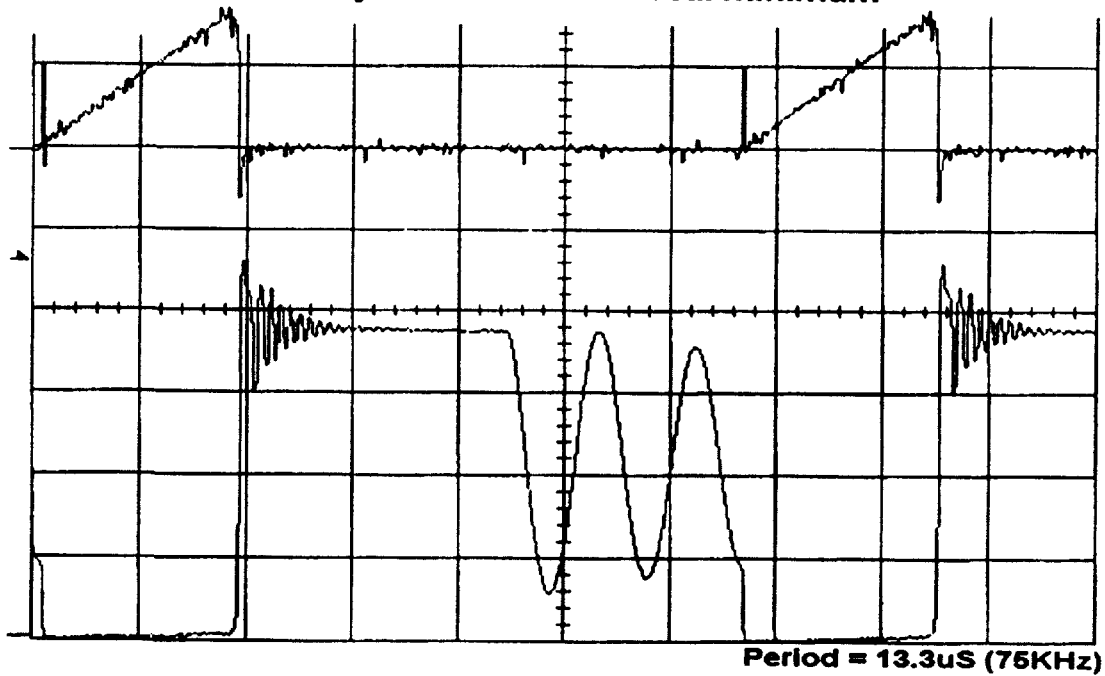

6. Similarly, we can jump to the third or higher valleys 226, compute the new power loss, and decide which valley gives the lowest switching power loss, as shown in FIG. 7F.

Figure 6:
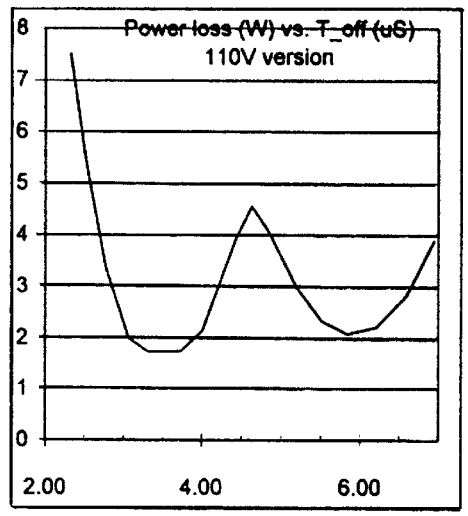
FIG. 6 shows a table and graph of power loss vs. $T_{OFF}$.
Figure 6:
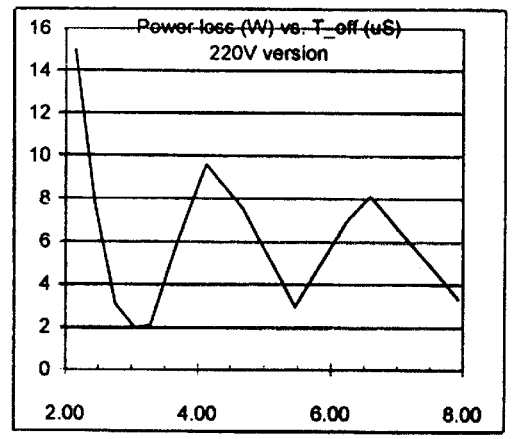

As can be seen from experimental results shown in the chart of FIG. 6. higher-valley switching can result in lower switching loss under high input voltage and low load conditions.

The use of a digital controller advances power supply design by eliminating a need to rely on fixed threshold detection or other simple control scheme. The drain voltage can be sampled to determine where is the minimum point (the "valley"). Hence, zero-voltage switching can be achieved under best operating conditions, and minimum-voltage switching for all other conditions. It is even possible to minimize switching loss by direct computation, without die need for threshold detection.

Furthermore, the implementation of a digital control releases the practical limitation of switching at the first valley, for example in the system and method outlined in Example 1. Under certain operating conditions, it is actually more desirable to switch at the second or subsequent valleys, as shown in FIG. 8.

By switching at the second or later valley, we can reduce the operational frequency significantly. Although the switching energy loss per cycle is slightly higher compared to switching at first valley, it is partially or completely compensated by lower switching frequency, hence the overall efficiency may actually improve under certain conditions.

Another immediate benefit is that since using second-valley switching reduces the switching frequency, the operation conditions can be expanded significantly, especially for very light load conditions. Experimental results indicate that, by operating at second or higher valley switching mode, it is possible to maintain QRC operation down to 9 Watts. So, the same QRC can operate consistently from normal mode (80W) all the way down to standby mode (15W).

EXAMPLE 3

Based on simulation results, a prototype QRC unit was constructed, similar in architecture to the circuit shown in FIG. 1. Only one secondary output (160V DC) is connected to a load resistor. Input power consumption and power factor were measured using a Voltech PM100 power meter.

The results, shown in the tables of FIGS. 9 and 10, demonstrate is that, under the best operating condition (normal load, line voltage at around 145V RMS), both the first-valley switching and second-valley switching modes give exactly the same efficiency. At lower line voltage (where conduction loss dominates), first-valley switching is more efficient. At higher line voltage (where switching loss increases with frequency), second valley switching is more efficient. At very light load, second- or third-valley switching is always more efficient.

Therefore, overall efficiency can be maximized by using an adaptive control algorithm, selecting an appropriate valley based on a control map or actual efficiency measurements. At low line voltage and heavy load (hence lower operating frequency), the traditional first-valley switching is employed. At high line voltage and light load condition (hence higher operating frequency), second- (or higher) valley switching may result in greater efficiently and are thus employed. Doing extends the operation range of the QRC significantly without additional cost to the power components.

It is to be understood that although the characteristics and advantages of the present invention have been set forth in the foregoing description, the disclosure is illustrative only, and changes may be made in arrangement of parts within the scope of the appended claims.

What is claimed is:

1. A method of controlling a switched mode resonant power system comprising:

sampling a waveform of a continuous switch parameter to form a digitized waveform;

analyzing the waveform to detect a series of parameter local minima;

selecting one of said series of parameter local minima from the digitized waveform; and closing the switch at one of said parameter local minima.

2. The method according to claim 1, wherein a parameter local minimum is selected based on a power dissipation of the switch.

3. The method according to claim 2, wherein the power dissipation is inferred from the sampled waveform and switched mode resonant power system parameters.

4. The method according to claim 1, wherein a digital control tests a plurality of parameter local minima to determine a least power dissipation mode.

5. The method according to claim 1, wherein said selecting step comprises determining a first local minimum, testing successive local minima for a criterion, and selecting a local minimum which best meets the criterion.

6. An apparatus for controlling a switched mode resonant power system comprising a programmable microcontroller, at least one waveform digitizer, a controllable switch, means for actuating a switch under control of the microcontroller, and a memory, said apparatus carrying out the acts of:

sampling a waveform of a continuous switch parameter;

analyzing the waveform to detect a parameter local minimum; and closing the switch at a parameter local minimum;

wherein said memory is for storing data relating to said analyzing act.

7. The apparatus according to claim 6, wherein the processor stores results from analysis of a plurality of parameter local minima.

8. A switching semiconductor control, comprising:

(a) a microcontroller having a program memory and a random access memory;

(b) a digitizer for digitizing a continuous switch parameter; and (c) an output for controlling a semiconductor switch,
wherein the program memory comprises a program for analyzing the continuous switch parameter and for controlling the semiconductor switch in dependence thereon.

9. The control according to claim 8, wherein the continuous switch parameter comprises a resonant waveform.

10. The control according to claim 8, wherein the continuous switch parameter is selected from or more of the group consisting of a switch voltage and switch current.

11. The control according to claim 8, wherein the continuous switch parameter comprises a plurality of regions each having a respective local inflection, wherein the program controls the microcontroller to analyze a plurality of the inflections to determine an optimum inflection.

12. The control according to claim 8, wherein the microcontroller controls the semiconductor switch for maximum power efficiency, and wherein the continuous switch parameter is a surrogate variable for power efficiency.

13. The control according to claim 8, wherein the program controls the microcontroller to store information relating to an analysis of a plurality of operational modes in the random access memory.

14. A method of controlling a resonant switching power system, comprising the steps of:

successively, for a plurality of different selected local minima:
(a) opening a semiconductor switch to generate a transient;
(b) analyzing a voltage or current waveform to detect a selected local minima;
(c) closing the semiconductor switch in coincidence with the selected local minimum and detecting a power dissipation associated therewith; and comparing a power dissipation associated with respective selected local minima to determine an optimum local minimum.

15. The method according to claim 14, wherein the power dissipation is inferred based on the analyzed voltage or current waveform and resonant switching power system parameters.

16. The method according to claim 14, further comprising the steps of analyzing the voltage or current waveform for a perturbation, and upon detection thereof, determining a new optimum local optimum.

17. The method according to claim 14, wherein an associated power dissipation for a respective selected local minimum is stored in a memory.

18. An apparatus for controlling a switched mode resonant power system comprising:

means for sampling a waveform of a continuous switch parameter to form a digitized waveform;

means for analyzing the waveform to detect a series of parameter local minima;

means for selecting one of said series of parameter local minima from the digitized waveform; and means for closing the switch at one of said parameter local minima.

* * * * *